(12) United States Patent
Kawamura et al.

(10) Patent No.: US 7,053,028 B2
(45) Date of Patent: May 30, 2006

(54) GREASE AND GREASE SEALED BEARING

(75) Inventors: Takayuki Kawamura, Kuwana (JP); Hidenobu Mikami, Kuwana (JP); Mitsunari Asao, Kuwana (JP); Yuji Oonuki, Fujisawa (JP); Toshiaki Endo, Fujisawa (JP)

(73) Assignees: NTN Corporation, Osaka (JP); Kyodo Yushi Co. Ltd., Tokyo (JP)

( * ) Notice: Subject to any disclaimer, the term of this patent is extended or adjusted under 35 U.S.C. 154(b) by 91 days.

(21) Appl. No.: 10/252,775

(22) Filed: Sep. 23, 2002

(65) Prior Publication Data

US 2003/0069147 A1    Apr. 10, 2003

(30) Foreign Application Priority Data

Sep. 27, 2001    (JP) .......................... P2001-298210

(51) Int. Cl.
*C10M 169/06* (2006.01)
(52) U.S. Cl. ...................... 508/555; 508/463; 508/551; 508/552; 508/580
(58) Field of Classification Search ................ 508/555, 508/551, 552, 580
See application file for complete search history.

(56) References Cited

U.S. PATENT DOCUMENTS

| | | | | |
|---|---|---|---|---|
| 2,709,157 A | * | 5/1955 | Hotten | 508/551 |
| 2,710,839 A | * | 6/1955 | Swakon et al. | 508/211 |
| 3,809,706 A | | 5/1974 | Mague et al. | |
| 3,928,214 A | * | 12/1975 | Naka et al. | 508/123 |
| 5,424,349 A | * | 6/1995 | Gatto | 524/222 |
| 6,500,787 B1 | * | 12/2002 | Tanaka et al. | 508/451 |

FOREIGN PATENT DOCUMENTS

| | | |
|---|---|---|
| CN | 1018842 | 4/1991 |
| EP | 0 336 875 | 10/1989 |
| JP | 60-031598 | 2/1985 |

OTHER PUBLICATIONS

Manual for the Bearings.

* cited by examiner

*Primary Examiner*—Ellen M. McAvoy
(74) *Attorney, Agent, or Firm*—Hedman & Costigan

(57) ABSTRACT

Disclosed is a grease that provides a prolonged lubricating lifetime to applied portions for use at high temperature, and a grease sealed bearing in which the bearing is sealed with this grease. This grease comprises a base oil, a thickener, and an amide-based wax. The amide-based wax is contained in an amount of 0.5 to 10% by weight based on the total amount of the grease, has a melting point of 80° C. or more, and an antioxidative ability to the base oil. The base oil is at least one base oil selected from the group consisting of an ether-based oil, an ester-based oil and a synthetic hydrocarbon oil, and has kinematic viscosity of 20 to 150 mm$^2$/s at 40° C. The thickener is an urea-based thickener, and is contained in an amount of 5 to 30% by weight based on the total amount of the grease.

14 Claims, 2 Drawing Sheets ically, the present invention relates to a grease and a grease
GREASE AND GREASE SEALED BEARING

BACKGROUND OF THE INVENTION

The present invention relates to a grease for sealing a ball-and-roller bearing built in a wide range of industrial equipment and automobiles, and a grease sealed bearing in which the bearing is sealed with this grease. More particularly, the present invention relates to a grease and a grease sealed bearing suitable for a ball-and-roller bearing used at high temperature and high speed rotation.

The ball-and-roller bearing built in the industrial equipment and the automobiles is sealed with a grease for lubricity. The grease is obtained by mixing a base oil and a thickener. Typical base oil is a synthetic lubricating oil such as a mineral oil, an ester oil, a silicone oil, and an ether oil. Typical thickener is a metal soap such as lithium soap, and an urea compound. Various additives such as an antioxidant, a rust preventive, a metal deactivator, and a viscosity index improver are added to the grease, as required.

In recent years, a demand for light-weighed automobiles urges to miniaturize and lighten electrical equipment of the automobiles. On the other hand, the electrical equipment of the automobile is required to provide high output and high efficiency. In the electrical equipment of the automobiles, a decrease in output accompanied by the miniaturization is compensated with a high speed rotation.

Accordingly, the ball-and-roller bearing is required to withstand the high speed rotation and a high load. The lifetime of the grease for sealing the bearing is generally shorter than that of the bearing itself. In other words, the lifetime of the bearing itself depends on that of the grease. There is a need to provide the grease having prolonged lifetime for preventing seizure at high temperature under the high speed and the high load.

Japanese Patent Laid-Open Application No. 60-31598 discloses a grease for sealing a ball joint for lowering operation torque at high temperature, comprising (A) 100 parts by weight of poly-α-olefin-based synthetic oil having viscosity of 500 to 2000 sct at 40° C., (B) 6 to 30 parts by weight of at least one wax selected from a group consisting of paraffin wax, polyethylene wax, microcrystalline wax and fatty acid amide wax, and (C) 1 to 50 parts by weight of an urea-based thickener. In fact, the boll joint grease uses mixed wax comprising two or four types of the above-mentioned waxes. Such ball joint grease has insufficient lifetime at high temperature under severe use conditions, especially under the high speed and the high load, accompanied by with the recent miniaturization and high performance of various machine members. An antioxidant or an extreme pressure agent is conventionally added to the grease in order to improve the lifetime at high temperature. However, sufficient effects are not yet achieved.

SUMMARY OF THE INVENTION

An object of the present invention is to provide a grease that provides a prolonged lubricating lifetime to applied portions for use at high temperature, and a grease sealed bearing sealed with this grease.

The grease according to the present invention comprises a base oil, a thickener, and an amide-based wax, wherein the amide-based wax is contained in an amount of 0.5 to 10% by weight based on the total amount of the grease, has a melting point of 80° C. or more, and an antioxidative ability to the base oil.

The base oil of the grease is at least one base oil selected from the group consisting of an ether-based oil, an ester-based oil and a synthetic hydrocarbon oil, and has kinematic viscosity of 20 to 150 mm$^2$/s at 40° C.

The thickener of the grease is an urea-based thickener, and is contained in an amount of 5 to 30% by weight based on the total amount of the grease.

The amide-based wax having a melting point of 80° C. or more, and an antioxidative ability to the base oil, i.e., being a solid state at room temperature, is contained in an amount of 0.5 to 10% by weight based on the total amount of the grease, whereby the thickener is less contained in the grease, and the base oil is more contained in the grease, and whereby the wax is dissolved during high temperature operation to increase the viscosity of the base oil.

The amide-based wax having an antioxidative ability to the base oil can prevent oxidation degradation at high temperature to significantly prolong the lifetime of the grease at high temperature.

The grease sealed bearing is characterized in that the bearing is sealed with the above-mentioned grease. The grease sealed bearing is used for electrical equipment of automobiles.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
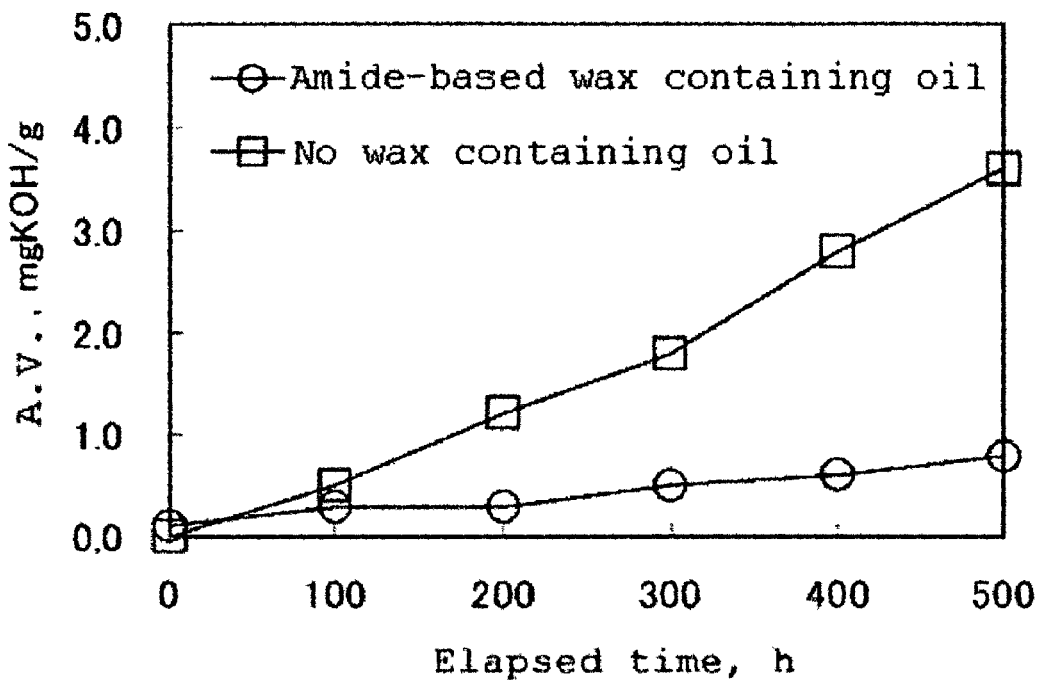
FIG. 1 is a graph showing a result of a total acid number measurement.

The base oil in the present invention can be used any base oils that are generally used for the grease. Examples include an ether-based oil, an ester-based oil, a synthesized hydrocarbon oil, and a mineral oil.

The ether-based oil, the ester-based oil, the synthesized hydrocarbon oil, or a mixture thereof are preferable. More preferably, the base oil comprises the ether-based oil as a main component. This is because the ether-based oil has excellent heat resistant and antioxidation properties.

Examples of the ether-based oil are an alkyldiphenyl ether oil, an alkyltriphenyl ether oil, and an alkyltetraphenyl ether oil.

Examples of the ester oil are a diester oil, a polyolester oil, or a complex ester oil thereof, and an aromatic ester oil.

Examples of the hydrocarbon oil are a poly-α-olefin oil, a copolymer of α-olefin and an olefin, an aliphatic hydrocarbon oil such as polybutene, and an aromatic hydrocarbon oil such as alkylbenzene, alkylnaphthalene, polyphenyl, and synthesized naphthene. Examples of the mineral oil are a paraffin-based mineral oil and a naphthene-based oil.

The base oil comprising the ether-based oil as the main component suitable for use in the present invention has kinematic viscosity of 20 to 150 mm$^2$/s at 40° C. If the kinematic viscosity is less than 20 mm$^2$/s, the base oil is easily evaporated, and has insufficient heat resistance. On the other hand, if the kinematic viscosity exceeds 150 mm²/s, the torque is high and heat generation value increases.

The amide-based wax having a melting point of 80° C. or more, and an antioxidative ability to the base oil contains an amide bond (—CONH—) in the molecule, or an amide group (—CONH₂) in the end of the molecule. Examples of the amide-based wax are represented by the following formulas (I) to (IV):

R₁CONHR₂  (I)

R₃CONHR₄CONHR₅  (II)

R₆CONH₂  (III)

R₇CONHCH₂OH  (IV)

where each $R_1$ to $R_7$ is a hydrocarbon group. Specifically, it is a saturated aliphatic hydrocarbon group, an unsaturated aliphatic hydrocarbon group, an aromatic hydrocarbon group, or an alicyclic hydrocarbon group.

Suitable amide-based wax include a fatty acid amide compound. Examples include N,N'-ethylenebis(stearoamide), stearic acid amide, N,N'-methylenebis(stearoamide), and methylolstearoamide.

The amide-based wax has a melting point of 80° C. or more, preferably 100° C. or more. If the melting point is less than 80° C., the wax has poor heat resistance, and evaporates easily during the high temperature operation.

Among the amide-based wax having a melting point of 80° C. or more, the amide-based wax has the antioxidative ability to the base oil can be used for the present invention. Since the amid-based wax having antioxidative ability, the lifetime of the grease at high temperature can be significantly improved.

As used herein, the base oil has the "antioxidative ability," means that the base oil has a value of 1.0 mgKOH/g or more calculated by the numerical expression [["an increase in a total acid number of the base oil containing no wax"]–["an increase in a total acid number of the base oil containing 5% by weight of the wax"]], after the base oil containing the wax and the base oil containing no wax are allowed to stand in air at 150° C. for 500 hours. The total acid number is measured in accordance with JIS K2501.

Figure 2:
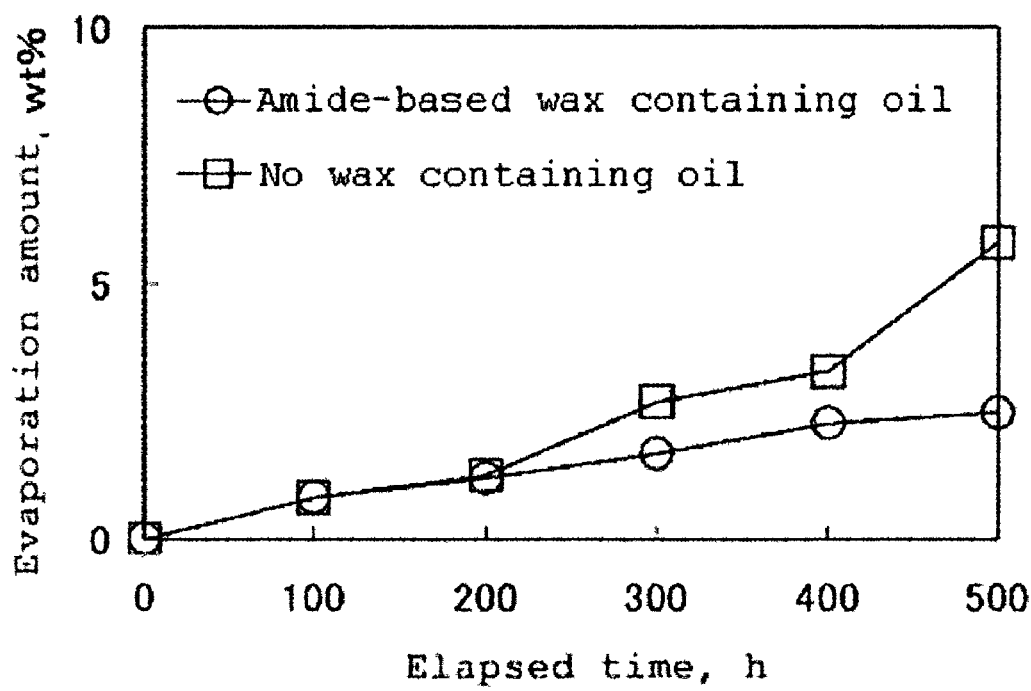
FIG. 2 is a graph showing a result of an evaporation amount measurement.

The base oil, in which the synthesized hydrocarbon oil and the alkyldiphenyl ether were mixed in the weight ratio of 1:4, was mixed with 5% by weight of N,N'-ethylenebis (stearoamide) as the amide-based wax. 10 g of the base oil mixed with the amide-based wax was taken into a 300 ml beaker, was allowed in air circulating type constant temperature bath set at 150° C., and was measured for the total acid number and the evaporation amount per 100 hours. FIGS. 1 and 2 show the results of the base oil mixed with the amide-based wax. FIG. 1 shows the total acid number until 500 hours elapsed. FIG. 2 shows the evaporation amount. As a comparison, there are also shown the results of the base oil containing no amid-based wax.

As shown in FIGS. 1 and 2, mixing the amide-based wax inhibits the increase in the total acid number of the base oil and the evaporation of the base oil, and improves the antioxidation and heat resistant properties.

The amount of the amide-based wax is 0.5 to 10% by weight based on the total amount of the grease. If the amount of the amide-based wax is less than 0.5% by weight, the antioxidation and heat resistant properties are less improved by adding the wax. On the other hand, if the amount of the amide-based wax exceeds 10% by weight, the components that contribute to lubricity of the base oil are unfavorably decreased.

The urea-based thickener for use in the present invention is represented by the following formulas (V) to (VII):

R₈—NHCONH—R₁₃—NHCONH—R₁₀  (V)

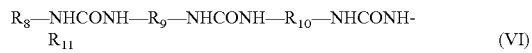

R₈—NHCONH—R₉—NHCONH—R₁₀—NHCONH-R₁₁  (VI)

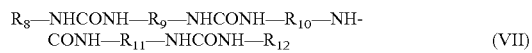

R₈—NHCONH—R₉—NHCONH—R₁₀—NH-CONH—R₁₁—NHCONH—R₁₂  (VII)

where each of $R_8$ to $R_{12}$ is at least one hydrocarbon group selected from the group consisting of an aromatic hydrocarbon group including 6 to 15 carbon atoms, an alicyclic hydrocarbon group including 6 to 12 carbon atoms, and an aliphatic hydrocarbon group including 6 to 20 carbon atoms, or mixtures thereof. If the numbers of the carbon atoms are less than the above-defined range, the thickening property becomes poor. On the other hand, the numbers of the carbon atoms exceed the above-defined range, the heat resistant property is deteriorated.

The $R_{13}$ is a di- or tri-valent group containing an aromatic hydrocarbon group, and includes an aromatic single ring, an aromatic fused ring, and a linked group thereof with a methylene chain, a cyanuric ring, an isocyanuric ring and the like. Examples of $R_{13}$ include residual group of diphenyl methane diisocyanate, tolylenediisocyanate and a dimer, a trimer, and the like thereof in which isocyanate groups are eliminated. When the $R_{13}$ is the group including the aromatic hydrocarbon, the heat resistant property of the grease is enhanced.

The urea-based thickener is obtainable by reacting an isocyanate compound with an amino compound. It is preferable that isocyanate groups of the isocyanate compound and amino groups of the amino compound are approximately equivalent in order not to leave reactive free radicals.

The grease may be prepared by reacting the isocyanate compound with the amino compound in the base oil, or by mixing the urea-based thickener synthesized in advance with the base oil. The former is preferable since the stability of the grease is easily kept.

The amount of the urea-based thickener is 5 to 30% by weight based on the total amount of the grease. If the amount of the urea-based thickener is less than 5% by weight, the grease becomes liquid with low viscosity. Such grease is easily leaked so that the bearing is hardly sealed. On the other hand, if the amount of the urea-based thickener exceeds 30% by weight, the grease is solidified, and consistency becomes 200 or less, resulting in an unusable grease for sealing the bearing.

The grease of the present invention comprises the base oil, the thickener, and the amide-based wax as the essential components as described above. In addition, the grease may comprise additives such as an extreme pressure agent, an antioxidant, a rust preventative, a metal deactivator, and an oily agent that are conventionally added to the grease.

Any known extreme pressure agent can be used, and can improve load resistant and extreme pressure properties. Examples of the extreme pressure agent in an organic metal type include an organic molybdenum compound such as molybdenum dithiocarbamate and molybdenum dithiophosphate; an organic zinc compound such as zinc dithiocarbamate, zinc dithiophsphate, and zinc phenate; an organic antimony compound such as antimony dithiocarbamate, and antimony dithiophosphate; an organic selenium compound such as selenium dithiocarbamate; an organic bismuth compound such as bismuth naphthenate, and bismuth dithiocarbamate; an organic iron compound such as iron dithiocarbamate and iron octylate; an organic copper compound such as copper dithiocarbamate and copper naphthenate; and an organic tin compound such as tin maleate, and dibutyltin sulfide. Also, an organic sulfonate, phenate, phosphate of an alkali metal or an alkali earth metal; or an organic metal compound of gold, silver, titanium, cadmium can be used as required. Examples of the extreme pressure agent in a sulfur type include a sulfide or polysulfide compound such as dibenzyldisulfide; sulfurized oil; a non-ash type carbamate compound; a thiourea compound; a thiocarponate. Examples of the extreme pressure agent in a phosphoric acid type include a phosphoric acid ester such as trioctylphosphate, and tricresylphosphate; a phosphoric acid ester-based compound such as acidic phosphoric acid ester, phosphorous acid ester, and acidic phosphorous acid ester.

Also, there can be used a halogen-based extreme pressure agent such as chlorinated paraffin; and a solid lubricant such as molybdenum disulfide, tungsten disulfide, graphite, PTFE, antimony sulfide, and a boron compound such as boron nitride. Among them, the dithiocarmic acid-based compound and the dithiophosphoric acid-based compound are preferable.

As the antioxidant, there can be used a rubber antioxidant, an antiozonant, and an oxidation inhibitor that are added to rubber, plastic, and lubricant, by selecting suitable one as required. Examples include an amine-based compound such as phenyl-1-naphtylamine, phenyl-2-naphtylamine, diphenyl-p-phenylenediamine, dipyridylamine, phenothiazine, N-methylphenothiazine, N-ethylphenothiazine, 3,7-dioctylphenothiazine, p,p'-dioctyldiphenylamine, N,N'-diisopropyl-p-phenylenediamine, N,N'-di-sec-butyl-p-phenylenediamine; and a phenol-based compound such as 2,6-di-tert-dibutylphenol.

Examples of the rust preventive include an ammonium salt of an organic sulfonic acid; an organic sulfonic acid salt, an organic carboxylic acid salt of an alkali metal or an alkali earth metal such as barium, zinc, calcium, and magnesium; phenate, phosphonate, an alkyl or an alkenyl succinic acid derivative such as an alkyl or an alkenyl succinic acid ester; a partially esterified multivalent alcohol such as sorbitan-monooleate; hydroxyl fatty acids such as oleoylsarcosine; mercapto fatty acids such as 1-mercapto stearic acid or metal salts thereof; higher fatty acids such as stearic acid; higher alcohol such as isostearyl alcohol; an ester of a higher alcohol and a higher fatty acid; thiazoles such as 2,5-dimercapto-1,3,4-thiadiazole, and 2-mercaptothiadiazole; an imidazole compound such as 2-(decyldithio)-benzimidazole and benzimidazole; a disulfide compound such as 2,5-bis(dodecyldithio)benzimidazole; a phosphoric acid ester such as trisnonylphenylphosphite; a thiocarboxylic acid ester compound such as dilaurylthiopropionate; and nitrite.

Examples of the metal inactivator include a triazole compound such as benzotriazole and tolyltriazole.

Examples of the oily agent include a fatty acid such as oleic acid and stearic acid; a fatty acid alcohol such as oleyl alcohol; a fatty acid ester such as polyoxyethylene stearic acid ester and polyglyceryloleic acid ester; phosphoric acid; a phosphoric acid ester such as tricresyl phosphate, lauryl acid ester and polyoxyethylene oleyl ether.

Figure 3:
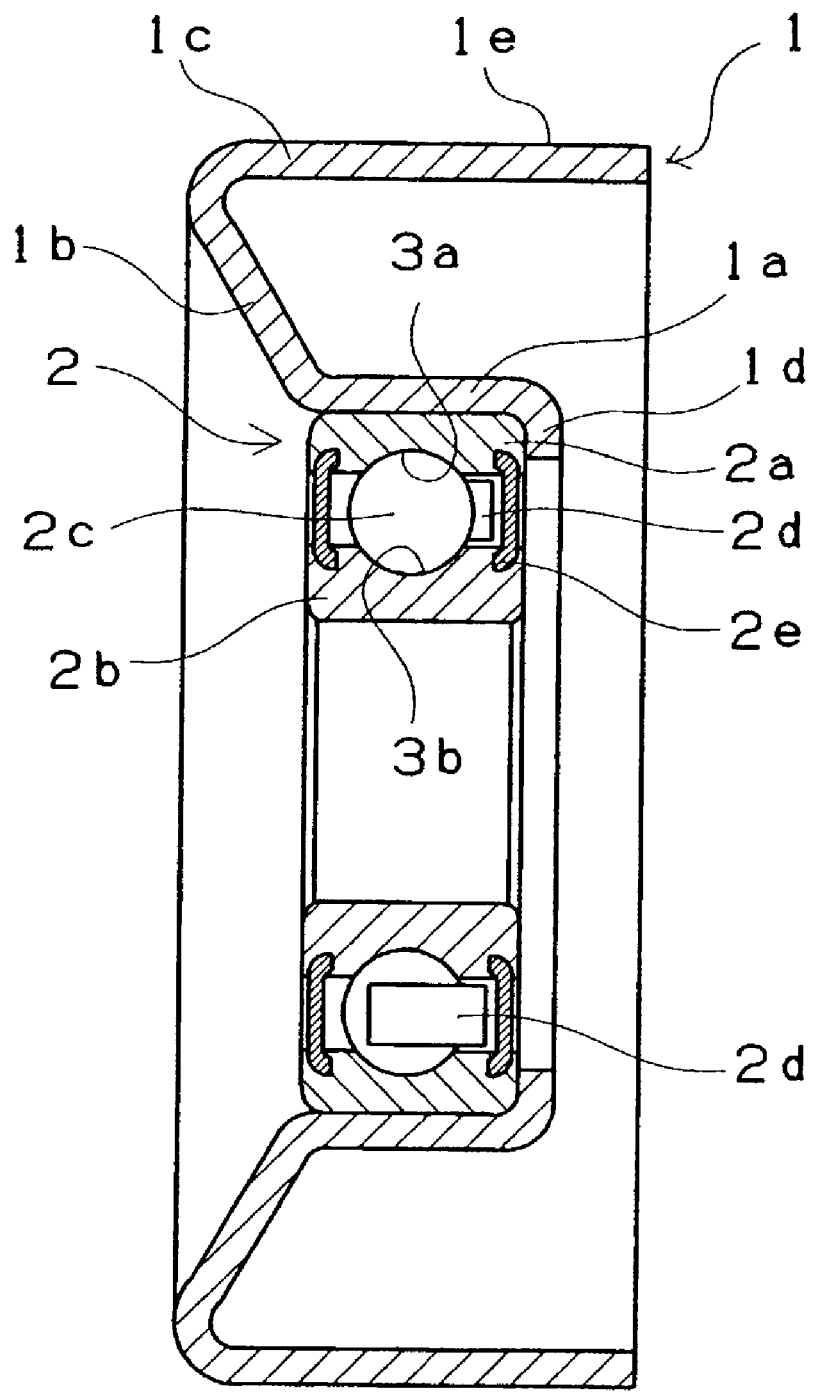
FIG. 3 is a sectional view showing an example of an idler pulley.

Referring to FIG. 3, the grease sealed bearing according to the present invention will be described. FIG. 3 shows a sectional view of one embodiment of an idler pulley used as a belt tensioner of a belt for driving an auxiliary machine in an automobile.

The pulley comprises a pulley body 1 made of steel plate press, and a single row deep groove ball bearing 2 that is fitted into an inside diameter of the pulley body 1. The pulley body 1 is in a ring shape including an inside diameter cylinder 1a, a flange 1b extending from an end of the inside diameter cylinder 1a to an outside diameter side, an outside diameter cylinder 1c extending from the flange 1b to an axis direction, and a brim 1d extending from another end of the inside diameter cylinder 1a to an inside diameter side. An outer ring 2a is fitted into the inside diameter cylinder 1a, and a rolling surface 1e that contacts with the belt driven by the engine is formed on the outside diameter cylinder 1c. The rolling surface 1e is contacted with the belt, whereby the pulley functions as the idler.

The ball bearing 2 comprises the outer ring 2a fitted into the inside diameter cylinder 1a, an inner ring 2b fitted into a fixed axis (not shown), a plurality of balls 2c built between raceway surfaces 3b, 3a of the inner and outer rings 2b, 2a, a cage 2d for holding balls 2c at regular intervals on circumference, and a pair of seals 2e for sealing a grease. The outer ring 2a and the inner ring 2b are formed integrally.

The grease sealed bearing according to the present invention has excellent heat resistant and antioxidation properties, and therefore can be suitable for the ball-and-roller bearing used in industrial and electrical equipment that require high heat resistance. Specifically, examples of the electrical equipment requiring the heat resistance for miniaturization include an alternator, an idler pulley, an electromagnetic clutch, and a clutch.

EXAMPLES 1 TO 7 AND COMPARATIVE EXAMPLES 1 TO 6

In each example, a base grease was prepared by mixing a base oil and an urea-based thickener in the ratio shown in Table 1. The base grease was obtained by reacting an isocyanate compound and an amino compound in the base oil.

In Table 1, a synthesized hydrocarbon oil 1 denotes a poly-α-olefin oil (manufactured by Amoco Chemical Co., Ltd.; having a kinetic viscosity of 30 $mm^2$/s at 40° C.), a synthesized hydrocarbon oil 2 denotes a poly-α-olefin oil (manufactured by Mobil Chemical Co., Ltd.; having a kinetic viscosity of 47 $mm^2$/s at 40° C.), an ester oil denotes a pentaerythritol ester oil (manufactured by Kao Corporation; having a kinetic viscosity of 33 $mm^2$/s at 40° C.), and an ether oil denotes alkyldiphenyl ether oil (manufactured by Matsumura Oil Research Corporation; having a kinetic viscosity of 97 $mm^2$/s at 40° C.).

As the urea thickeners shown in Table 1, an aliphatic diurea was obtained by reacting 4,4'-diphenylmethanediisocyanate with octylamine; an alicyclic diurea was obtained by reacting 4,4'-diphenylmethanediisocyanate with cyclohexylamine; and an aromatic diurea was obtained by reacting 4,4'-diphenylmethanediisocyanate with p-toluidine.

The base grease was mixed with an amide-based wax. In Table 1, an amide-based wax was having a melting point of 143° C. denotes N,N'-ethylenebis(stearoamide), an amide-based wax was having a melting point of 100° C. denotes a stearic acid amide, an amide-based wax was having a melting point of 108° C. denotes a methylol stearoamide, and an amide-based wax was having a melting point of 74° C. denotes an oleic acid amide.

The base oil, the urea thickener, and the amide-based were mixed so that the total grease was 100% by weight. Then, the antioxidant, the rust preventative and the like were added thereto in the amount of 5% by weight based on the total amount of the grease.

The grease was evaluated by a high temperature and high speed test, and a quick acceleration and deceleration test.

The results are shown in Table 1. Also, viscosity and consistency measured in accordance with JIS K2220 of the base oil are shown.

High temperature and high speed test

A ball-and-roller bearing (6204) was sealed with 1.8 g of grease to be tested, rotated at 10000 rpm, at an outer diameter temperature of an outer ring of the bearing of 150° C. under a radial load of 67 N and an axial load of 67 N. A time to seizure was measured. The results are also shown in Table 1.

Quick Acceleration and Deceleration Test

A quick acceleration and deceleration test was conducted to a ball-and-roller bearing that supported a rotating shaft with an inner ring; the rotating shaft supporting a pulley around which a rotating belt of an alternator was wound; the alternator being one example of electrical auxiliary equipment. Operation conditions of the quick acceleration and deceleration test were set as follows: a load of 3234 N to the pulley, and a rotating speed of 0 to 18000 rpm. An endurable time (life time) was measured, which was the time to produce abnormal peeling within the bearing, to detect higher vibration than a set value by an oscillation detector, and finally to stop a generator. The results are also shown in Table 1.

As shown in Table 1, in each Example, excellent results are obtained both in the high temperature and high speed test and the quick acceleration and deceleration test. On the other hand, in each Comparative Examples, poor results are obtained both in the high temperature and high speed test and the quick acceleration and deceleration test, since no amide-based wax having a melting point of 80° C. or more was mixed therein.

The grease according to the present invention comprises 0.5 to 10% by weight of the amide-based wax having a melting point of 80° C. or more, and having antioxidative ability to the base oil, whereby the oxidation degradation at high temperature can be prevented, and the lifetime of the grease at high temperature can be significantly prolonged.

The grease comprises at least one base oil selected from the group consisting of an ether-based oil, an ester-based oil and a synthetic hydrocarbon oil, and has kinematic viscosity of 20 to 150 mm$^2$/s at 40° C., and comprises 5 to 30% by weight of the urea-based thickener based on the total amount of the grease, whereby a grease composition having grease properties suitable for the ball-and-roller bearing used at high temperature and high speed rotation can be provided.

In the grease sealed bearing according to the present invention, the bearing is sealed with the above-mentioned grease. Accordingly, such bearing has excellent high temperature durability under high speed and high load, accompanied by the recent miniaturization and high performance of various machine members. Thus, there is provided the grease sealed bearing suitable for use in electrical equipment of an automobile.

TABLE 1

| | Example | | | | | | | Comparative Example | | | | | |
|---|---|---|---|---|---|---|---|---|---|---|---|---|---|
| | 1 | 2 | 3 | 4 | 5 | 6 | 7 | 1 | 2 | 3 | 4 | 5 | 6 |
| Content (wt %) | | | | | | | | | | | | | |
| Base oil | | | | | | | | | | | | | |
| Synthesized hydrocarbon oil 1 | 15 | — | — | — | — | 15 | — | 15 | — | 85 | — | — | — |
| Synthesized hydrocarbon oil 2 | — | 84 | — | — | — | — | — | — | 15 | — | — | — | — |
| Ester oil | — | — | 86 | — | 15 | — | 15 | — | — | — | 86 | — | 15 |
| Alkyldiphenyl ether oil | 60 | — | — | 72 | 60 | 60 | 60 | 62 | 60 | — | — | 77 | 62 |
| Thickener | | | | | | | | | | | | | |
| Aliphatic diurea | — | 7 | — | — | — | — | — | — | — | 8 | — | — | — |
| Alicyclic diurea | — | 6 | 13.5 | — | — | — | — | — | — | 7 | 14 | — | — |
| Aromatic diurea | 20 | — | — | 18 | 20 | 20 | 20 | 23 | 20 | — | — | 23 | 23 |
| Amide-based wax compound (Tm 143° C.)*1 | 5 | 3 | 0.5 | 10 | 5 | — | — | — | — | — | — | — | — |
| Amide-based wax compound (Tm 100° C.)*2 | — | — | — | — | — | 5 | — | — | — | — | — | — | — |
| Amide-based wax compound (Tm 108° C.)*3 | — | — | — | — | — | — | 5 | — | — | — | — | — | — |
| Amide-based wax compound (Tm 74° C.)*4 | — | — | — | — | — | — | — | — | 5 | — | — | — | — |
| Properties | | | | | | | | | | | | | |
| Viscosity of base oil (40° C., mm$^2$/s) | 72 | 47 | 33 | 97 | 81 | 72 | 81 | 72 | 72 | 47 | 33 | 97 | 81 |
| Consistency (JIS K2220) | 300 | 275 | 280 | 300 | 290 | 300 | 300 | 300 | 300 | 270 | 270 | 300 | 285 |
| High temp. & high speed test, h | 5050 | 5400 | 4050 | 5250 | 7050 | 4800 | 6650 | 2100 | 2150 | 3500 | 3450 | 3750 | 3500 |
| Quick acceleration and deceleration test, h | >300 | — | — | >300 | >300 | — | — | >300 | — | — | 86 | >300 | >300 |

Note)
*1: Amide-based compound (N,N'-ethylenebisoctadecaneamide)
*2: Amide-based compound (stearic acid amide)
*3: Amide-based compound (methylol stearoamide)
*4: Amide-based compound (oleic acid amide)

What is claimed is:

1. A grease comprising:
   a base oil
   a thickener, and
   an amide-based wax,
   wherein the amide-based wax is contained in an amount of 0.5 to 10% by weight based on the total weight of the grease, has a melting point of 80° C. or more, and an antioxidative ability to the base oil,
   wherein the base oil is at least one base oil selected from the group consisting of an ether-based oil, an ester-based oil and a synthetic hydrocarbon oil, and has a kinematic viscosity of 20 to 150 mm$^2$/s at 40° C.,
   wherein the thickener is an urea-based thickener, and is contained in an amount of 5 to 30% by weight based on the total weight of the grease
   wherein the amide-based wax is represented by the following formula (II):

$$R_3CONHR_4CONHR_5 \quad (II)$$

where $R_3$, $R_4$, and $R_5$ are aliphatic groups.

2. A grease as claimed in claim 1, wherein the amide-base wax has melting point of 100° C. or more.

3. A grease as claimed in claim 1, wherein the amide-based wax is characterized by a value of 1.0 mgKOH/g or more calculated by "an increase in a total acid number of the base oil containing no wax" minus "an increase in a total acid number of the base oil containing 5% by weight of the wax", after the base oil containing the wax and the base oil containing no wax are allowed to stand in air at 150° C. for 500 hours.

4. A grease as claimed in claim 1, wherein the amide-based wax is at least one wax selected from the group consisting of N,N'-ethylenebis (stearamide), and N,N'-methylenebis (stearamide).

5. A grease as claimed in claim 1, wherein the base oil is an ether-based oil.

6. A grease as claimed in claim 5, wherein the ether-based oil is an alkyldiphenylether oil.

7. A grease as claimed in claim 1, wherein the base oil is the ester-based oil.

8. A grease as claimed in claim 1, wherein the base oil is the synthetic hydrocarbon oil.

9. A grease as claimed in claim 1, wherein the base oil is a mixed oil of the ether-based oil, the ester-based oil, or the synthetic hydrocarbon oil.

10. A grease sealing bearing, in which the bearing is sealed with the grease as claimed in claim 1.

11. A grease sealed bearing as claimed in claim 10, which is for use in electrical equipment of an automobile.

12. A grease for use in electrical equipment of an automobile comprising:
    a base oil
    a thickener, and
    an amide-based wax,
    wherein the amide-based wax is contained in an amount of 0.5 to 10% by weight based on the total weight of the grease, has a melting point of 80° C. or more, and an antioxidative ability to the base oil,
    wherein the base oil contains at least one base oil selected from the group consisting of an ether-based oil, an ester-based oil and a synthetic hydrocarbon oil, and has kinematic viscosity of 20 to 150 mm$^2$/s at 40° C.,
    wherein the thickener is an urea-based thickener, and is contained in an amount of 5 to 30% by weight based on the total weight of the grease
    wherein amide-based wax is represented by the following formula (II):

$$R_3CONHR_4CONHR_5 \quad (II)$$

where $R_3$, $R_4$, and $R_5$ are aliphatic groups.

13. A grease as claimed in claim 12, wherein the amide-based wax is contained in an amount of 0.5 to 5% by weight based on the total weight of the grease.

14. A grease for use in electrical equipment of automobile consisting essentially of:
    a base oil
    a thickener, and
    an amide-based wax,
    wherein the amide-based wax is contained in an amount of 0.5 to 10% by weight based on the total weight of the grease, has a melting point of 80° C. or more, and an antioxidative ability to the base oil,
    wherein the base oil is at least one base oil selected from the group consisting of an ether-based oil, an ester-based oil and a synthetic hydrocarbon oil, and has kinematic viscosity of 20 to 150 mm$^2$/s at 40° C.,
    wherein the thickener is an urea-based thickener, and is contained in an amount of 5 to 30% by weight based on the total weight of the grease,
    wherein amide-based wax is represented by the following formula (II):

$$R_3CONHR_4CONHR5 \quad (II)$$

where $R_3$, $R_4$, and $R_5$ are aliphatic groups.

* * * * *